Figure 5:
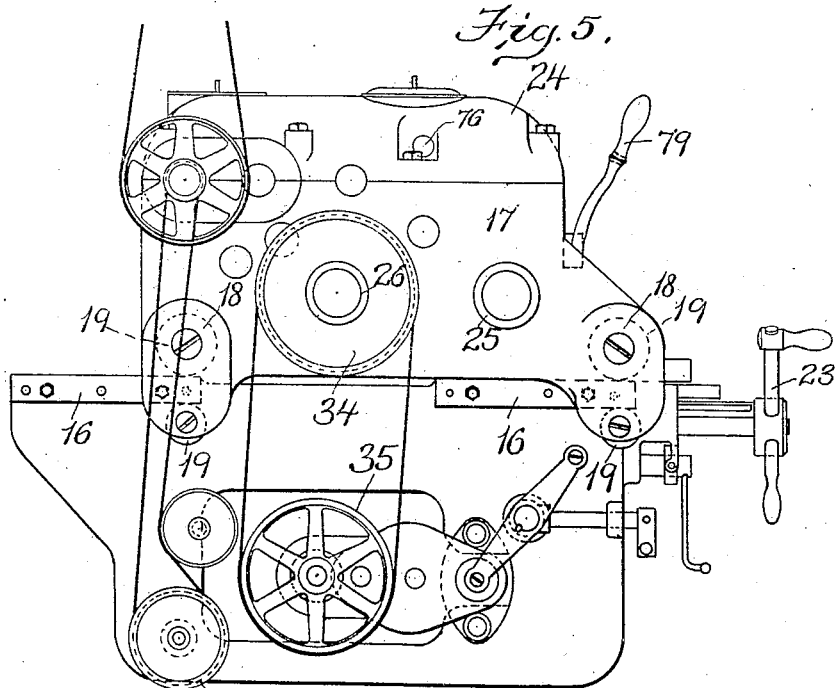

J. HARTNESS & G. A. PERRY.
TURRET LATHE.
APPLICATION FILED SEPT. 7, 1911.
1,056,332.
Patented Mar. 18, 1913.
7 SHEETS—SHEET 1.
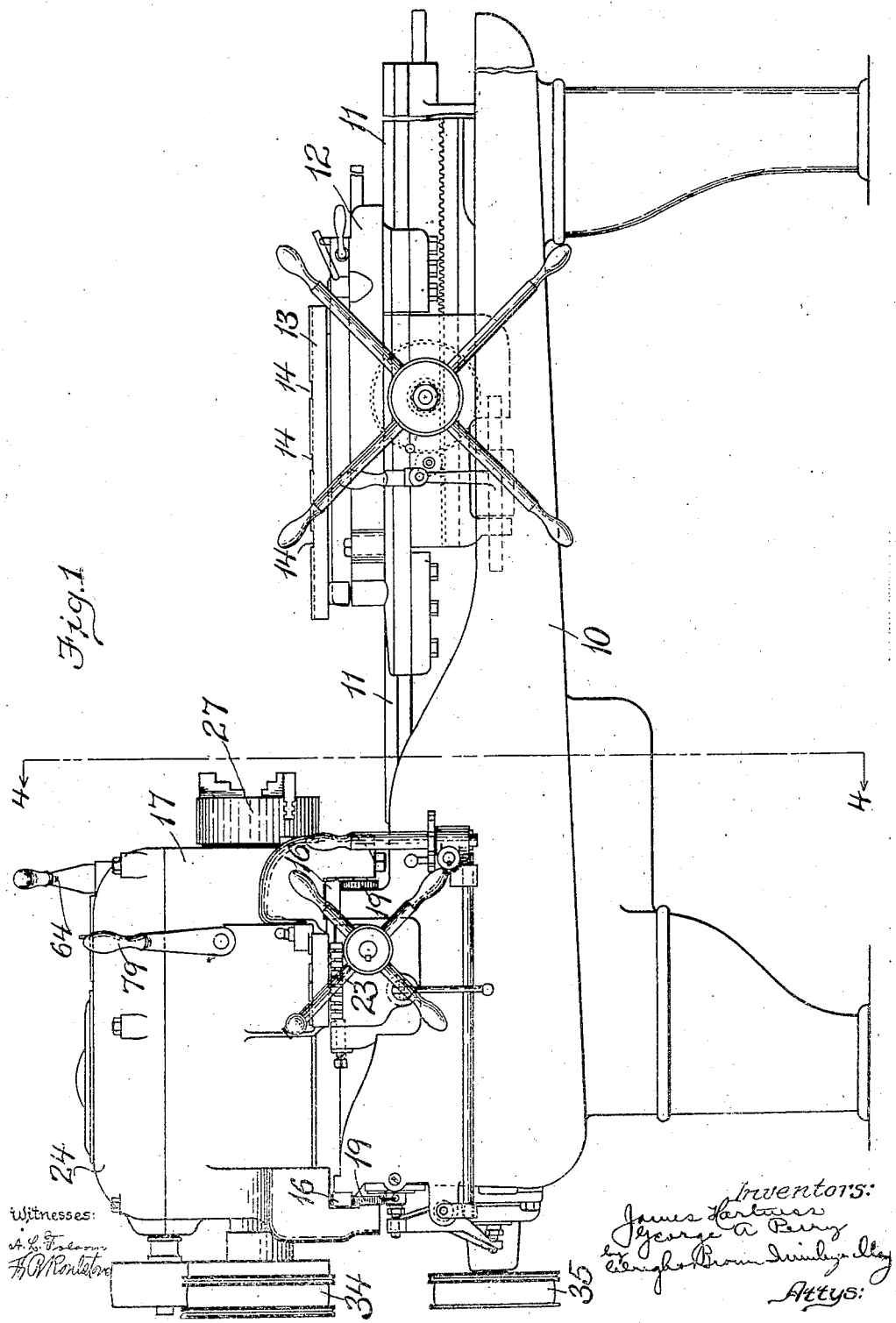

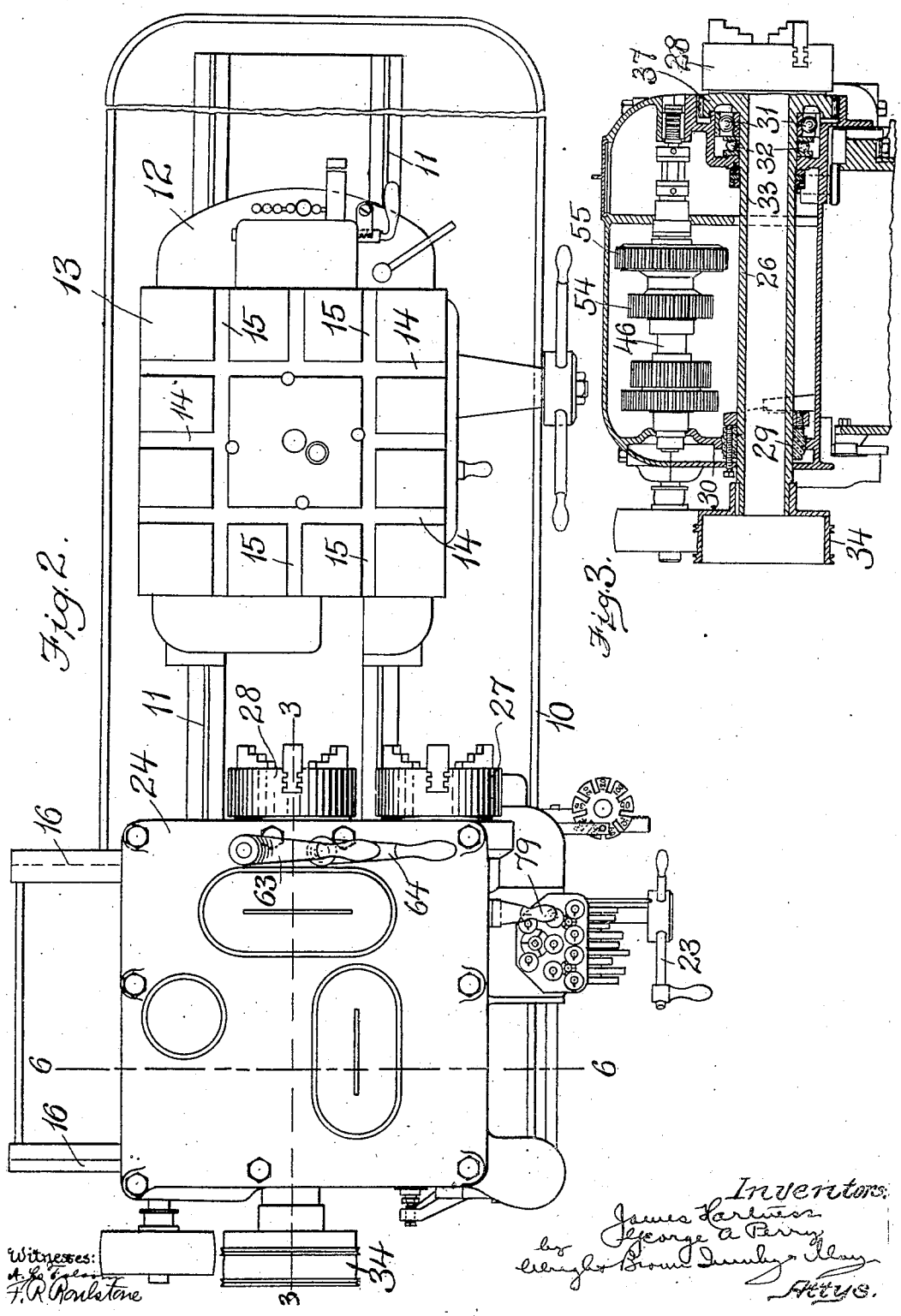

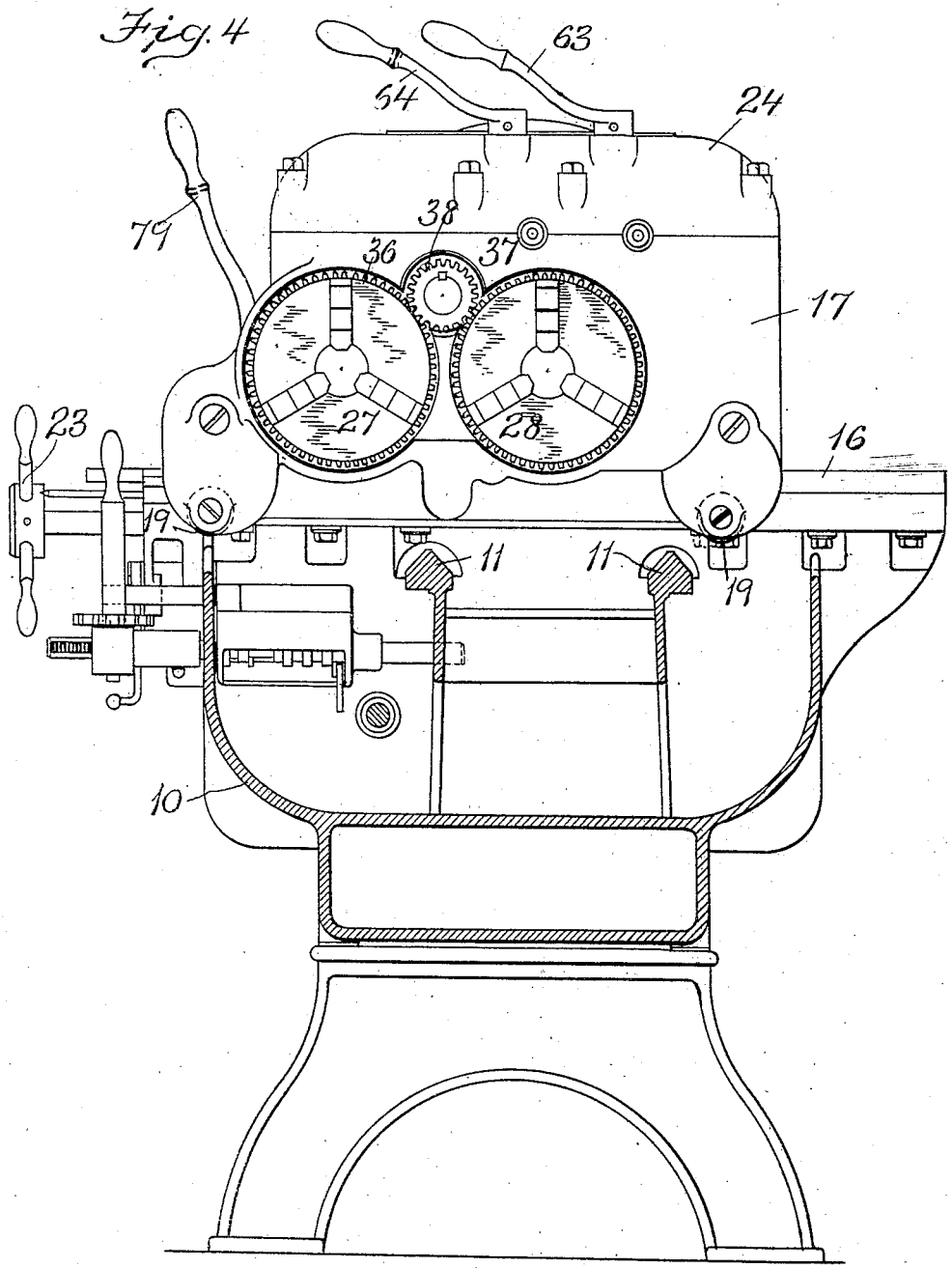

J. HARTNESS & G. A. PERRY.
TURRET LATHE.
APPLICATION FILED SEPT. 7, 1911.

1,056,332.

Patented Mar. 18, 1913.
7 SHEETS—SHEET 4.

Witnesses

Inventors

J. HARTNESS & G. A. PERRY.
TURRET LATHE.
APPLICATION FILED SEPT. 7, 1911.

1,056,332.

Patented Mar. 18, 1913.

7 SHEETS—SHEET 5.

Witnesses:
Inventors:

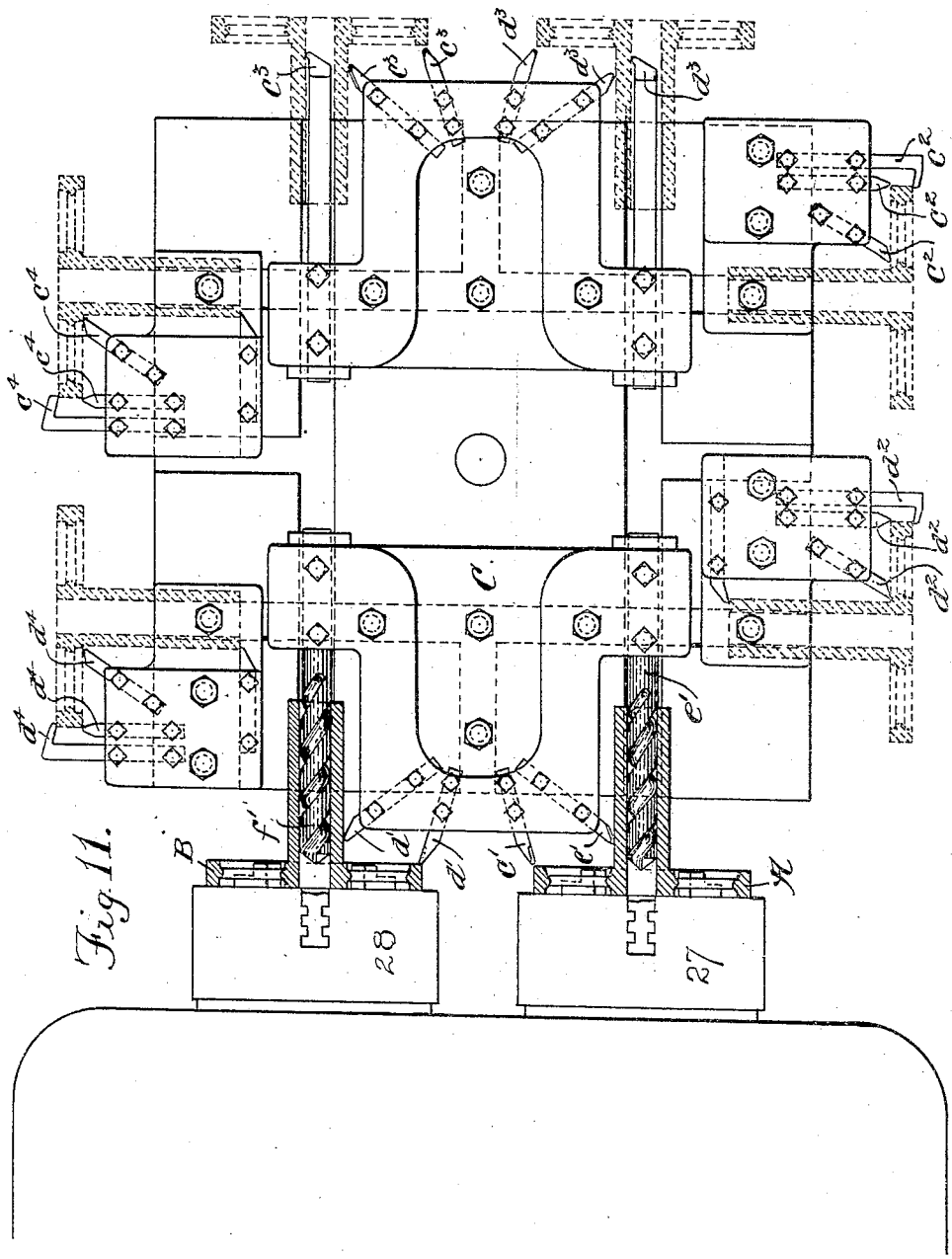

UNITED STATES PATENT OFFICE.

JAMES HARTNESS AND GEORGE A. PERRY, OF SPRINGFIELD, VERMONT; SAID PERRY ASSIGNOR TO JONES & LAMSON MACHINE COMPANY, OF SPRINGFIELD, VERMONT, A CORPORATION OF VERMONT.

TURRET-LATHE.

1,056,332.   Specification of Letters Patent.   Patented Mar. 18, 1913.

Application filed September 7, 1911.   Serial No. 648,147.

*To all whom it may concern:*

Be it known that we, JAMES HARTNESS and GEORGE A. PERRY, citizens of the United States, and resident of Springfield, in the county of Windsor and State of Vermont, have invented certain new and useful Improvements in Turret-Lathes, of which the following is a specification.

This invention has relation to turret lathes such as are employed for turning bars or detached metal pieces. Such machines have been brought to a high state of efficiency, but their output is necessarily limited because of the fact that only one piece of work at a time can be turned. Recourse has therefore been had in recent years to machines of the multi-spindle type in which a plurality of work-carrying spindles are employed, one set of spindles being rotated about a common axis to bring each piece of work successively into registration with the tools. These machines, however, have been usually employed for bar work, such as in the manufacture of screws and similar small pieces of work, and except for such small work are unreliable and inaccurate in operation because of the practical impossibility of constructing a machine in such manner that all the work-carrying spindles will register with all the tool-carrying spindles with the same accuracy, no practical method of construction or design having been provided in machines on the market to produce a satisfactory adjustment of parts to compensate for the unequal wear which results from the use of the machine.

The present invention has for its object to produce a turret lathe with its inherent stability and rigidity of parts and with its nicety of adjustment and yet provided with a plurality of work-carrying spindles to permit the turning or reduction of a plurality of pieces of work of relatively large diameter, such as gear blanks and other pieces of work which are in shop parlance called "chucking work." In accordance with this object of the invention we provide the headstock of the lathe with two or more work-carrying spindles which are adapted to receive and rotate simultaneously two pieces of work to be turned, faced, or otherwise reduced. These spindles are driven by any suitable variable speed gearing by which power may be transmitted to both spindles. In conjunction with said spindles we employ a separate set of tools for the work carried by each spindle, and a flat turret mounted upon the tool carriage adapted to receive said sets of tools. In order that the tools may operate upon both pieces of work simultaneously, we find it desirable to make the turret square in plan view whereby both tools may be set at the same distance from the headstock.

It has heretofore been proposed, in one instance, as shown in the patent to Southworth and Cushing No. 116,880, dated July 11, 1871, to provide a turret lathe with a pair of synchronously driven work spindles, but in this case the machine could be used for only bar work such as in making small screws or like articles, for the tools were located in apertures formed in the peripheral faces of the turret, and no provision was made for securing a relative transverse movement of the cutters and the work.

The present invention is adapted, as previously stated, not only for bar work, but also for chucking work, in which the pieces of work may be faced or tapered or any other like operation performed upon them. This is accomplished by mounting the spindles upon a head which is movable transversely of the bed, so that the two pieces of work may be moved laterally with relation to the tools. Moreover by locating the cutters upon the upper face of the turret, we are able to employ a plurality of cutters for each piece of work, all operating simultaneously, and each performing a separate operation.

Figure 6:
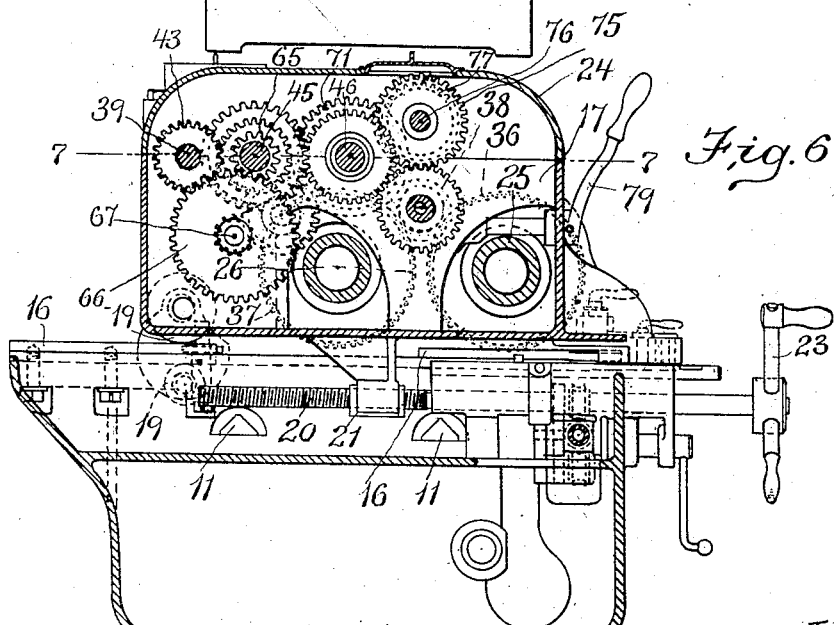
Figure 7:
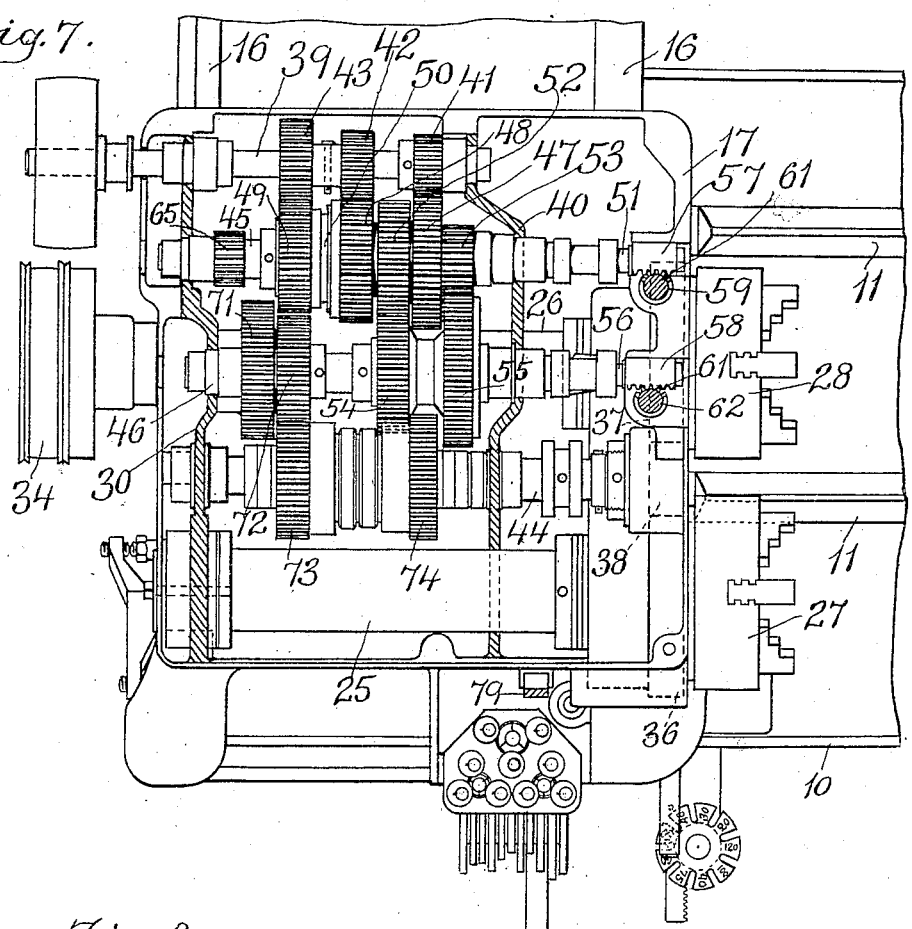
Figure 8:
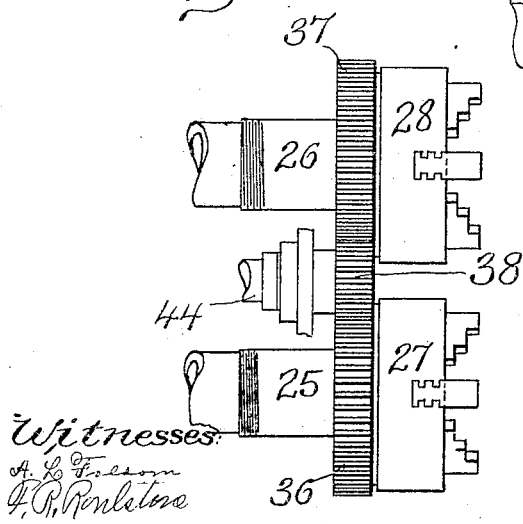
Figure 9:
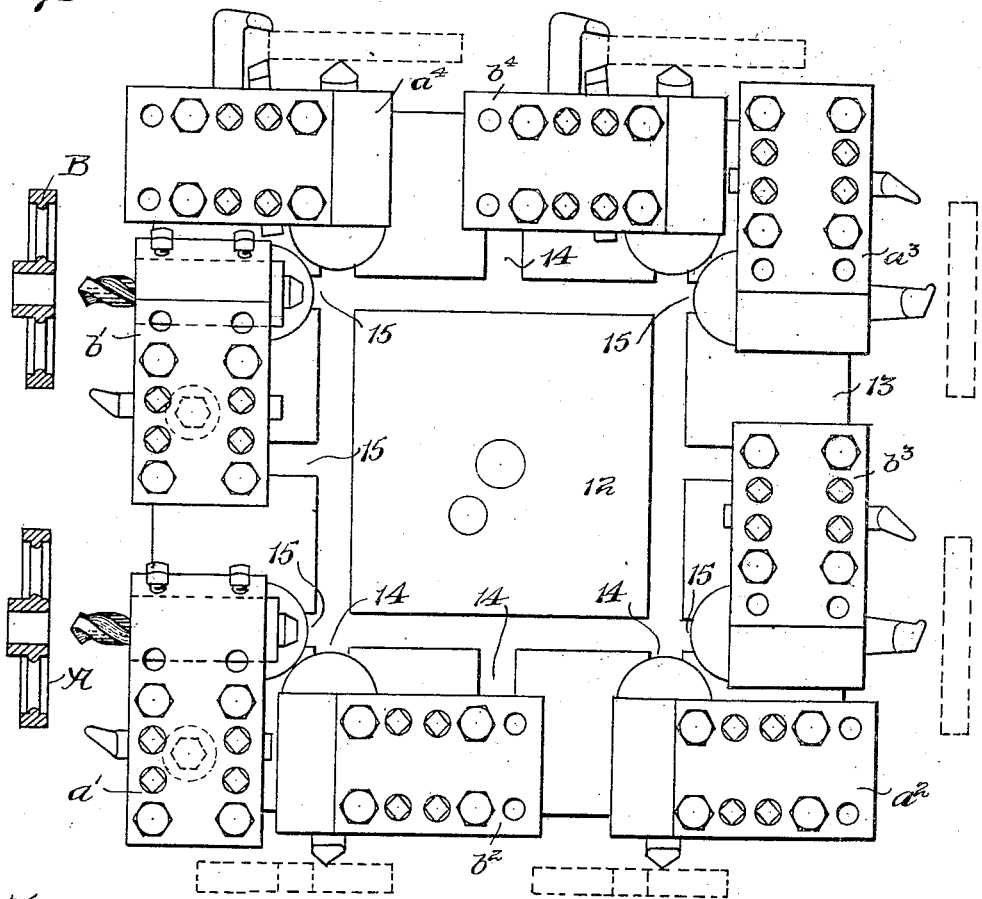
Figure 10:
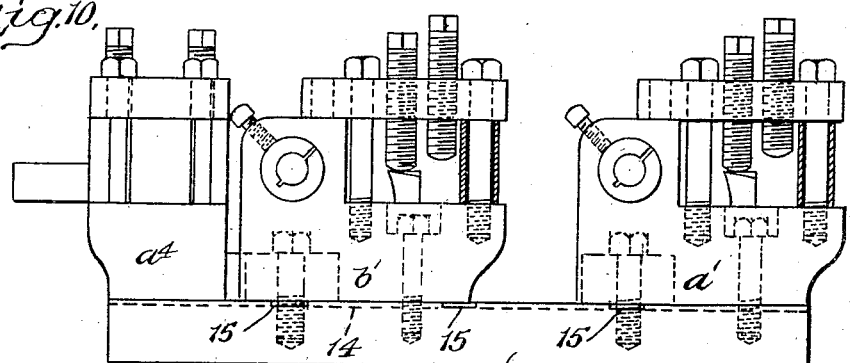

On the accompanying drawings,—Figure 1 represents a front elevation of a turret lathe embodying the invention. Fig. 2 represents a plan view thereof. Fig. 3 represents a longitudinal section through the head on line 3—3 of Fig. 2. Fig. 4 represents a vertical transverse section of the lathe on the line 4—4 of Fig. 1. Fig. 5 represents an end elevation of the lathe. Fig. 6 represents a transverse vertical section on the line 6—6 of Fig. 2. Fig. 7 represents a horizontal section through the head on the line 7—7 of Fig. 6. Fig. 8 shows the two work spindles and the driving gear which intermeshes with gears carried thereby. Figs. 9 and 10 illustrate respectively a plan view and a side elevation of the turret equipped with a separate set of tools for each work spindle. Fig. 11 illustrates the turret as being provided with an arrangement of tools of which there is a separate set for each work spindle.

The same reference characters indicate the same or similar parts wherever they occur.

The invention is illustrated as embodied in a lathe in which the relative length feed of the tools and the work is secured by moving the tool slide, and the relative cross feed of the tools and the work is secured by moving the work-head or carriage, but it is not necessarily limited to a machine of this character. The bed of the lathe is indicated at 10, and it may be constructed, as ordinarily, with ways or shears 11, 11, on which the tool carriage 12 is adapted to slide longitudinally of the bed. The carriage 12 is provided with a flat rotatable turret 13 adapted to be moved four steps to complete one revolution upon its vertical axis. The upper face of the turret is provided with a plurality of right-angled grooves 14, 15, so that tools may be secured upon the upper face thereof near the corners, as shown in Figs. 9, 10 and 11. The tool slide may be moved longitudinally of the bed by suitable mechanism, but as this feature of the machine forms no part of the present invention, and as any convenient mechanism may be utilized for the purpose, we shall not describe it. A suitable mechanism for this purpose is illustrated in Letters Patent No. 771,242, granted to James Hartness, October 4, 1904, or in Letters Patent No. 771,243, granted on the same day. At the end of the lathe the bed is provided with transverse guides or rails 16 on which the work carriage or head 17 is supported and on which it may be moved transversely or at right angles to the ways or shears 11 on which the tool carriage moves to secure a relative cross-feed of the tools and the work. Instead of sliding on the rails 16 the work carriage is provided with rollers 18 which roll upon the tracks, additional rolls 19, 19, being utilized to prevent upward movement of the head away from the rails. We do not herein claim the specific means for mounting the work carriage upon the bed, as it is set forth and claimed in the co-pending application of James Hartness, Serial No. 647,873, filed September 6, 1911, to which reference may be had for a full description of the rails and rollers.

The work carriage is moved either by hand or by power through the medium of a feed screw 20 journaled in the bed and engaging a nut 21 secured upon a bracket 22 depending from the head as shown in Fig. 6. The forwardly projecting unthreaded end of the screw is provided with a handle 23 by which it may be rotated. Any suitable form of mechanism may be utilized for rotating the feed screw by power, such for instance as that illustrated in the co-pending application of James Hartness, Serial No. 648,166, filed September 7, 1911.

The head or carriage 17 is of a box-like construction closed by a top or cover 24 so that it may contain a suitable lubricant in which the gearing may splash. Two hollow work-carrying spindles 25, 26, are journaled in parallelism in the head in the same horizontal plane, as shown in Figs. 1 and 2. On the end of each spindle nearest the tool carriage there is a chuck or other form of work holder, such as indicated at 27, 28, so that two similar pieces of work may be secured in the two chucks and rotated simultaneously. For convenience, the rear end of the spindle is journaled in a tapered soft metal sleeve or bushing 29 located in a web 30 which is cast or otherwise secured in the head or carriage 17. The other end of the spindle is mounted in ball bearings indicated as a whole at 31, and is held against axial movement by an anti-friction thrust bearing indicated as a whole at 32. The spindle is held in place by any suitable means, such as collars 33 threaded thereon, as shown in Fig. 3. Incidentally, the spindle 26 at its end opposite the chuck is provided with a belt pulley 34 from which power may be transmitted to a pulley 35 journaled on the bed, from which power is transmitted to the mechanisms for moving the carriages. Inasmuch as the spindles are hollow they may be provided, if desired, with any usual devices for feeding bar work therethrough. We have not shown any of these devices, as they are common and well known.

The two spindles at their chuck ends are provided with similar large gears 36, 37, with both of which intermeshes a gear 38 by which both spindles may be driven in unison from the same power transmitting mechanism. Any suitable mechanism may be utilized for this purpose, but we have illustrated and will describe one form of power-transmitting mechanism which we find suitable for the purpose, although it may be varied to suit any particular requirement or to secure the rotation of the spindles at any desired speed.

Referring to Fig. 7, the prime power shaft is indicated at 39. It is journaled in the web 30 and in a second web 40 which is cast or secured in the box-like head or carriage. This shaft has on it the three gears 41, 42, 43, which increase in diameter in the order named. Between the prime power shaft 39 and the shaft 44 on which the gear 38 is secured are two intermediate shafts 45, 46, being all in the same plane. The shaft 45 is provided with gears 47, 48 and 49 intermeshing with those at 41, 42 and 43. Suitable clutches, indicated at 50, operated by a controlling rod 51, are utilized to clutch to the shaft 45 either of the gears 48 or 49. The usual ratchet clutch (which is not shown in detail) is employed for connecting the gear 47 with the shaft 45, so that when the two gears 48 and 49 are disconnected from the shaft 45 power will be transmitted to said shaft through the train of gears 41, 47. On the shaft 45 are two additional gears 52, 53, intermeshing with gears 54, 55, on the shaft 46. Either of these two gears may be clutched to said shaft by any suitable form of clutch operated by the rod 56. The two rods 51, 56, are provided with racks 57, 58, engaged by pinions 59 and 60 on vertical shafts 61, 62, which project upwardly through the cover 24 and are provided with handles 63, 64, by which they may be rotated (see Figs. 4 and 7). The shaft 45 is provided with another gear 65 secured thereon and intermeshing with and driving a gear 66 on a shaft 67 (see Fig. 6), said shaft 67 being provided with a pinion 68 intermeshing with and driving a gear 69 on a shaft 70 shown in dotted lines in said last-mentioned figure. The said gear 69 intermeshes with a gear 71 on the shaft 46. Likewise secured on the shaft 46 there is a gear 72 intermeshing with a gear 73 on the shaft 44 to rotate said shaft and impart a forward rotation to the spindle. Between the gear 71 and the shaft 46 there is preferably a ratchet clutch so that the shaft will be rotated by the gear when the two gears 44 and 45 are unclutched from the shaft.

By means of the gearing thus far described, the spindles may be rotated forwardly at any one of a plurality of speeds. To cause reverse rotation of the spindles there is upon the shaft 44 a gear 74 with which intermeshes a gear 75 on a shaft 76 journaled in the cover portion of the box-like head. The shaft 76 is driven by a gear 77 intermeshing with the same gear 72 on the shaft 46 which we have previously referred to. The two forward and reverse gears 73, 74 may be clutched alternately to the shaft 44 by any suitable form of clutch operated by a rock-shaft 78 extending through the front of the head or carriage and having thereon a handle 79 by which it may be actuated. From this description, it will be apparent that both spindles will be driven in unison at any one of a variety of speeds, and that when the rotation of one is reversed, the other will be simultaneously reversed by the actuation of the single lever 79.

We have not illustrated the mechanism for rotating the turret upon its axis, which is at an angle to the path of movement of the tool slide, as any common mechanism can be utilized for this purpose.

We have illustrated in Figs. 9 to 11 various arrangements of the tools, there being a separate set of tools on the turret for the work carried by each spindle.

Referring to Figs. 9 and 10, the turret is provided with the tools $a'$ $a^2$ $a^3$ and $a^4$ which are adapted to operate successively upon the work A which is held in one of the work spindles. For successive operation upon the work B held in the other spindle, there are tools indicated at $b'$ $b^2$ $b^3$ and $b^4$. The corresponding tools $a'$ $b'$ simultaneously perform identical operations upon the two pieces of work A B, and this is true of the corresponding tools of the two sets $a^2$ $b^2$, $a^3$ $b^3$, and $a^4$ $b^4$. Certain of the tools are supported upon the corners of the turret as shown. The tools indicated at $a^2$ $b^2$, $a^4$ $b^4$ are provided with facing cutters, whereas the other tools are provided with cutters or like instrumentalities for operating upon the periphery of the work. The precise construction of the tool is unimportant and need not be described in detail, as they are varied in accordance with the character of the work to be performed.

It is not essential that the tool bodies of the two sets of tools should be independent of each other; for instance, in Fig. 11, we have illustrated the turret as being provided with two sets of tools in which the same bodies support the cutters of two sets. In this case, the work A and B is being simultaneously operated on by the cutters indicated at $c'$ $c'$ and $d'$ $d'$. The cutters $c'$ $c'$ belong to the tools of one set whereas the cutters $d'$ $d'$ belong to the tools of the other set; and yet all of these cutters are supported upon the same body C. The same body C likewise supports the two boring cutters $e'$ and $f'$. The cutters referred to are for drilling the bore of the work and also rough-turning the hub and the periphery of the wheel which forms the work. The cutters indicated at $c^2$ and $d^2$ form rough facing cuts on the two pieces of work indicated by the dotted lines. The cutters $c^3$ and $d^3$ finish the bore of the work and form finishing cuts on the periphery of the work; whereas the cutters $c^4$ $d^4$ form finishing facing cuts. In all of the forms of tools illustrated, it is possible to accurately locate the cutters which are to operate successively upon the same piece of work with the greatest accuracy without at all affecting the cutters which are to operate upon the other piece of work.

With the construction as we have illustrated it, it is possible for an operator to practically double the output of a turret lathe, inasmuch as two pieces of work may be turned, faced, or otherwise reduced, at the same time and with the greatest nicety of operation. A single rotation of the turret brings both tools which are to operate upon the work into position to engage the work. While the output of the machine is greatly increased, we have, as previously stated, retained the nicety of operation and the stability and rigidity of the parts found in turret lathes. Moreover, we are enabled to use all the various forms of box and other tools which are usable on turret lathes. By removing the chucks we are able to employ work holders and reversible arbors for holding the work, as shown in the co-pending application of James Hartness, Serial No. 647875.

In multi-spindle machines all the work spindles are presented successively to a set of tools, and unless each tool or each piece of work is independently adjusted relatively to the others, when it reaches the station at which it is to be operated upon by any particular tool, the result is an inaccuracy in the cut, due to the impossibility of securing an accurate registration of all the tools and all the pieces of work. In this machine, we have illustrated and described, however, each piece of work has its own separate set of tools upon the turret, so that these tools can be set with the greatest nicety and accuracy to operate upon said piece of work; thus the errors in practice due to the inaccuracy of registration of the tools and the pieces of work are avoided or overcome. The turret carries, as previously explained, two independent sets of tools, the tools of one set operating upon the work held in one spindle, and the tools of the other set acting upon the work held in the other spindle, and yet both pieces of work are reduced or cut at the same time. Another advantage of this type of machine over the multi-spindle machine is that when duplicate pieces of work are being turned, the two tools are fed simultaneously to the same extent by the feeding movement of the turret carrier, and consequently the tool carrier is moved only to the extent necessary to make the same cuts, whereas in multi-spindle machines it is always the case that one tool in performing one kind of operation must take a longer cut than the other simultaneously operated tool, and therefore the output of the machine is limited in time to the interval required to take the longest cut. In other words, if a four-spindle machine is used in producing a piece on which there are four kinds of cuts, one of which takes thirty seconds and another one takes one minute, the time in which the machine will turn out pieces is at the rate of one per minute, whereas in this machine the output will not be limited to the long cut. It will be a sum of all the cuts.

Having thus explained the nature of our said invention, and described a way of constructing and using the same, although without attempting to set forth all of the forms in which it may be made or all of the modes of its use, what we claim is:

1. A turret lathe comprising a bed, a tool carriage arranged to move longitudinally thereon, a turret on said carriage movable about an axis at an angle to the path of travel of said tool carriage, and having a flat top for the reception of a plurality of simultaneously operable tools, a head on said bed, a plurality of work spindles journaled in said head, power-transmitting gearing for rotating said spindles, means for moving said head and thereby said spindles transversely of the path of movement of said tool carriage, and a plurality of sets of tools on the top of said turret for the pieces of work held by said spindles, said sets comprising tools at the several stations of the turret.

2. In a turret lathe, a bed, a work carriage, a pair of work spindles journaled thereon, means for moving said carriage transversely of said bed, and a power-transmitting mechanism on said carriage common to both spindles, in combination with a tool carriage movable on said bed toward and from said head, a turret on said carriage movable about an axis angular to the path of movement of said carriage, said turret having in its top right-angle grooves for the reception of tools and separate sets of tools on said turret, one set for each work spindle, to operate simultaneously and successively on the pieces of work held in said spindles.

3. In a turret lathe for performing multiple operations upon the same piece of work, the combination with a transversely movable head having a plurality of work spindles and means for moving said head transversely, of a carriage, a turret thereon, a separate set of tools on the turret for each piece of work, the tools of each set being disposed on the said turret at the various stations to cause the corresponding tools of each set to operate simultaneously on the work carried by the spindles, and means for moving said head transversely, whereby both pieces of work may be faced or turned simultaneously.

In testimony whereof we have affixed our signatures, in presence of two witnesses.

JAMES HARTNESS,
GEORGE A. PERRY.

Witnesses:
J. W. WALKER,
J. W. BENNETT.